Aug. 6, 1968          N. E. SKARSTEN          3,395,691
                      PORTABLE BARBECUE
Filed March 9, 1966                    2 Sheets-Sheet 2
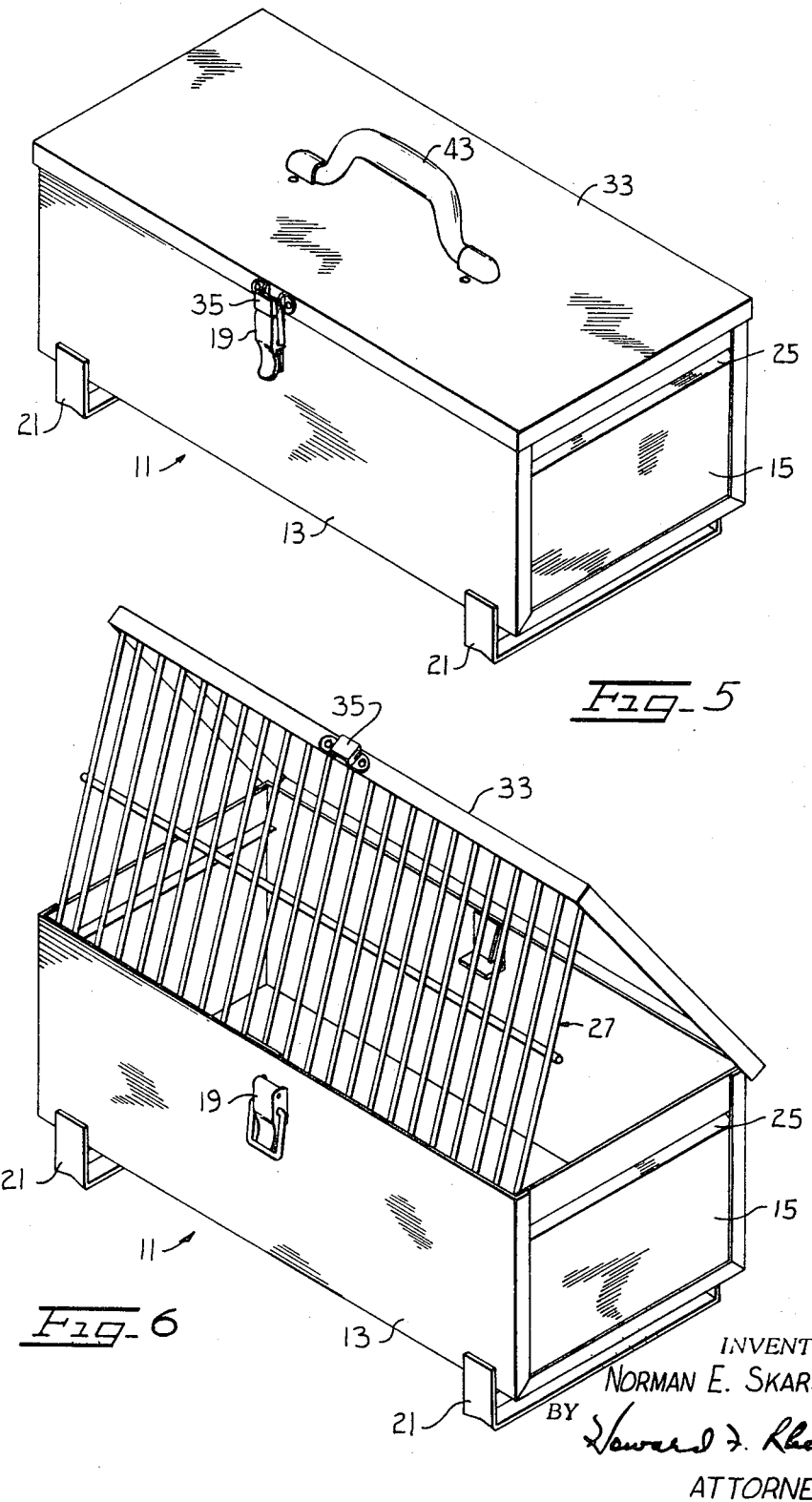
INVENTOR.
NORMAN E. SKARSTEN
BY Howard F. Rhea
ATTORNEY 3,395,691
PORTABLE BARBECUE
Norman E. Skarsten, 5933 Estates Drive,
Oakland, Calif. 94611
Filed Mar. 9, 1966, Ser. No. 533,095
7 Claims. (Cl. 126—25)

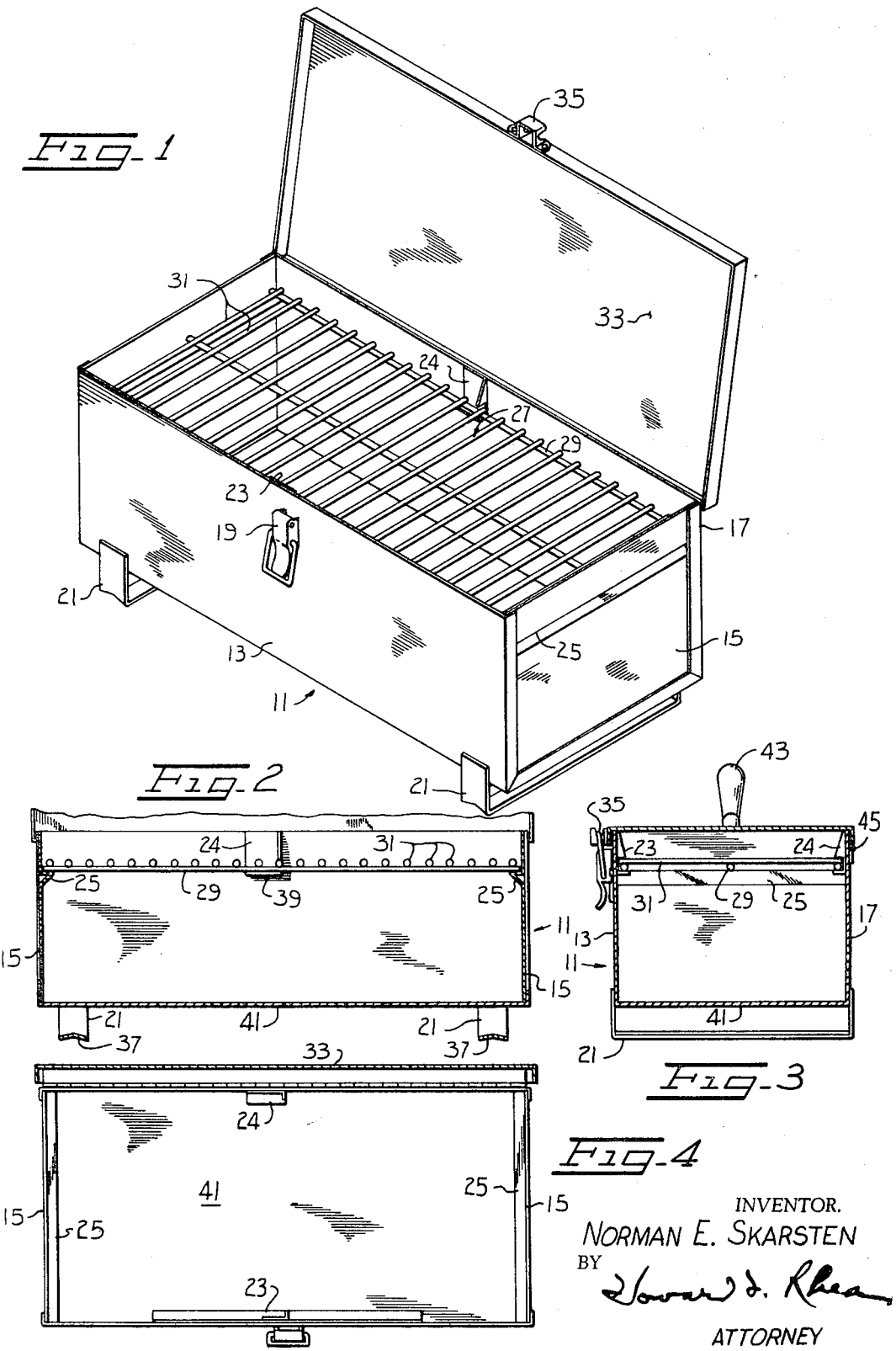

ABSTRACT OF THE DISCLOSURE

A charcoal burning stove has a box like configuration and a hinged lid with clamps for tightly closing the lid and thereby extinguishing the charcoal for subsequent uses; a handle on the lid gives portability and legs are provided for insulating the heat of the box from the surface on which it rests; a grill is supported by a projecting ledge inside of each end wall of the stove and by a projecting ledge guarded by a projecting cam portion inside of each side wall of the stove, the side walls flex to permit the grill to be snapped past the cam portions and thereby be locked in place.

---

This invention relates to an extinguishable portable barbecue, and more particularly, to a portable barbecue having a relatively airtight cover for the extinguishment of burning briquettes, so that the same briquettes may be used on several occasions.

In the invention, a generally box-shaped configuration, normally constructed of sheet metal, is provided with ventilating legs, a tightly fitting cover, and various structural modifications to include a grill. In its closed condition, the completed portable barbecue has an appearance similar to that of an ordinary tool box with legs.

The appearance is somewhat deceptive, however, as the device economically and ingeniously combines a number of elements which make for a great convenience in its everyday use as a portable barbecue. The legs, for example, are specially V-shaped, so as to provide a maximum of surface exposed to the cooling effect of air, a minimum of surface in contact with the table or other support, and extra strength. The end panels of the barbecue are indented or channelled at an appropriate location for the grill support, thereby also gaining desirable structural rigidity. The cover is hinged by a piano-type hinge running the length of the box, for rear panel stability, and the front grill support is extended for some length along the front panel in order to give that member greater rigidity.

Finally, the cover is secured to the open box portion by a clamp or other device of similar nature, in order that the latching of the cover will provide a sufficient air seal to cause extinguishment of burning material in the box. The cover is also provided with a carrying handle, to give one hand portability.

It is a fairly simple matter to use the portable barbecue as a space heater by the simple expedient of wedging the lid partially open by means of the grill, thereby reflecting into the space before the box the heat from the interior of the box. This use may be preferably enhanced by including foil along the inner reflecting surface of the cover.

The interior surfaces of the box itself may be lined with foil to increase the amount of heat radiated upwardly and to lessen the heat loss through radiation from the box itself.

The front and rear grill supports are formed with ear portions which are bent out to hold the grill in place. These ear portions are disposed upwardly of the horizontal support portions of the supports and contain a notch adjacent to the support portion. The supports themselves are mounted on the resilient sheet metal comprising the front and rear panels of the box, which panels bend outwardly when the relatively rigid grill is pressed down into the box, and the grill becomes latched into the notches, thereby providing not only a cooking surface, but also a grate for the disposal of burned ash, when the box is turned upside down for such disposal.

The safety factors of the barbecue are most important. First and foremost, there is no need, nor is it even desirable, to dispose of combustible material at a camp site. Furthermore, there is no problem of extinguishing a fire. The cover is merely closed, and the unburned portion of the briquettes is saved for another day and the fire disposal and extinguishment problems are solved in a completely safe manner.

Another safetly feature is the ready use of the box itself as an emergency bucket for the carrying of water or sand or other material with which to extinguish other fires.

As a practical matter, it has been found that upon closing the cover, burning briquettes are extinguished so rapidly that the handle may be handled immediately. The box itself cools, through radiation, within a vary few minutes. This cooling is, of course, somewhat dependent upon box color, and darker colors enhance this effect.

Another preferable feature of the construction is slight overlapping of the front portion of the cover, so as to give the clamp or other latch some slight elasticity to provide a more air-tight fit.

The economies of the invention extend to initial cost as well as to fuel conservation. A spot-welded sheet metal version of the invention herein can easily be manufactured for only a few dollars and the construction lends itself readily to mass production methods which are even less costly per unit produced.

It is an object of the invention to provide a barbecue which is portable and which has the foregoing features and advantages. It is a further object of the invention to provide a barbecue wherein the briquettes or other combustible material may be used a plurality of times.

It is also an object of the invention to provide a portable barbecue having little heat transfer to its supporting surfaces, and which is readily adapted to other purposes, including space heating.

The invention will be better understood by reference to the following figures and detailed description, wherein:

FIG. 1 is a perspective view of the barbecue with the cover in an open position.

FIG. 2 is a longitudinal cross-sectional view with the cover in an open position and only partially shown.

FIG. 3 is an end cross-sectional view with the cover in the closed position.

FIG. 4 is a top plan view of the barbecue as shown in FIG. 2.

FIG. 5 is a perspective view of the barbecue with the cover in a closed position.

FIG. 6 is a perspective view of the barbecue with the cover in a partially open position.

Referring first to FIG. 1, the portable barbecue of the invention is shown in its operating position. Box 11 is comprised of a front panel 13, two end panels 15, a rear panel 17 and a bottom panel 41 not shown in FIG. 1, but apparent in FIG. 3.

As a matter of construction, it is most economical to make front panel 11, bottom panel 41 and rear panel 17 of one piece of sheet metal. Welded or otherwise affixed to box 11 are two legs 21, each of which has one end terminating in a connection with front panel 13 and the other end terminating in a connection with rear panel 17.

Mounted along front panel 13 is clamp 19. This clamp 19 cooperates with its top portion 35 mounted on cover 33 when cover 33 is in closed position. Various modifications of the hook type clamp 19 as shown in the figures are of course known to the art and may be used in the invention herein, such as a loop clamp, a hinge clamp and a spring-loaded link lock.

Just visible in FIG. 1 is the top portion of front grill support 23.

Affixed to the inner surface of rear panel 17 is rear grill support 24, with an upper portion bent outwardly and containing a notch for seating the grill immediately above the supporting portion. Each end panel 15 includes a channel 25, and grill 27 rests on channel 25 at either end of the box 11, together with front grill support 23 and rear grill support 24. Grill 27 is made up of at least two longitudinal members 29 and a plurality of cross members 31. Three longitudinal members 29 are shown, and at least two of these are preferably near the ends of cross members 31, so as to engage front grill support 23 and rear grill support 24. The spacing between adjacent cross members 31 is preferably arranged so that when the box is turned upside down, burned ash will readily fall through the grill spaces but unburned briquettes of any usable size will not.

Referring to FIG. 2, legs 21 are shown to contain a V-shaped valley 37 on the surfaces which contact the barbecue support. These V-shaped indentations allow air circulation around legs 21 and dissipate the heat transferred to legs 21 by induction from their connection to box 11.

A possible shape of channels 25 is clearly shown in FIG. 2. While a V-shaped indentation of panel 15 to form channel 25 is noted in this figure, any configuration which is convenient to manufacture might be used as well, as for example, a U-shaped configuration. This comment also applies to legs 21, which might be curved into an upside-down U, rather than the V-shape shown.

In the end cross section of FIG. 3, the top portion 35 of clamp 19 is shown in its engaged position. Clamp 19 and top portion 35 are mounted so that cover 33 will be brought tightly down on the edges of box 11 in this position. The construction of front grill support 23 and rear grill support 24 is also apparent in FIG. 3. These supports are constructed with an outwardly projecting upper portion having a notch just above the support portion so that the grill is latched in, and the whole barbecue may be turned upside down for ash disposal. In such a position, grill 27 acts as a grate, retaining usable briquettes and allowing ashes to fall through.

FIG. 3 also shows handle 43 affixed to cover 33 and hinge 45 securing cover 33 to rear panel 17.

In the top view of FIG. 4, the elongated nature of front grill support 23 is readily apparent. The construction of this support in this manner serves at least four functions. These are, to make front panel 13 more rigid, to form a support for grill 27 in the space heating position shown in FIG. 6, to provide additional support for grill 27 in the operating position of FIG. 1, and to allow enough flexibility so that grill 27 may be removed.

FIG. 5 illustrates the portable barbecue in its closed or portable position. Visible in FIG. 5 are legs 21, front panel 13, panel 15, cover 33 and handle 43, as well as channel 25 in panel 15.

Finally, FIG. 6 depicts the barbecue in its space heating position. Grill 27 is supported on grill support 23 and the upper inner portion of cover 33. Heated material in box 11 causes radiant energy to be reflected from the inner surface of cover 33 into the space in front of box 11.

It has been found, as a practical matter, that in normal barbecuing, five or six uses of the same heating material may be made if cover 33 is drawn tightly to box 11 by clamp 19 when cooking has been completed on each occasion. Furthermore, the charcoal is easy to light each time, as distinguished from charcoal which has been wet.

Cover 33 is preferably formed so as to slightly overhang front panel 13 of box 11, so as to provide some flexibility in the operation of clamp 19, and so as to give a better air seal in the closed position. It is obvious also that box 11 may be used to store, perhaps with ice for refrigeration, the camp provisions, and it may similarly be used as an emergency water bucket in the closed position.

To remove grill 27 from box 11, front panel 13 is pulled forward, and can move forward to some extent because front grill support 23 does not extend the whole length of panel 13.

In the ordinary use of the portable barbecue, front panel 13 is pulled forward so as to release grill 27 from front grill support 23, and grill 27 is temporarily removed. Charcoal or other combustible material is then placed in the interior of box 11, and this combustible material is lit. Thereafter grill 27 is replaced, and the material to be cooked is placed atop grill 27.

When cooking has been completed, cover 33 is secured in the closed position atop box 11 by clamp 19, and the charcoal rapidly extinguishes because of lack of air. Subsequently, upon another occasion, the cover 33 is opened, and the same charcoal relit, either with or without the addition of new charcoal.

At convenient times, the extra ash is simply disposed of by merely turning the box upside down with grill 27 in place, and allowing the ashes to fall through the grill openings while the unburned charcoal above a certain size is automatically retained.

In the use of the invention as a space heater, the inside surface of cover 33 is preferably lined with aluminum foil or other reflecting surface. Then grill 27 is placed in the position shown in FIG. 6 and the barbecue reflects heat forward.

If desired, the interior of the box 11 may be lined with foil, as such lining tends to keep the box cooler and focus the heat toward grill 27.

Having thus described my invention, it is obvious to those skilled in the art that various modifications may be made from the exact form shown and described without departing from the sphere and scope of the invention.

Accordingly, my invention is to be limited only by the following claims:

1. A portable barbecue including a box of generally rectangular cross section, legs attached to said box, a cover for said box, means to secure said cover snugly against said box, a grill, and grill supports inside said box, said grill supports including an outwardly projecting upper portion having a notch adjacent to a supporting portion.

2. The portable barbecue of claim 1 wherein said means to secure said cover comprises a clamp on one side of said cover cooperating with a hinge on the other side of said cover.

3. The portable barbecue of claim 1 wherein said grill supports include channels formed in two opposing inside panels of said box and two grill supports having an outwardly projecting upper portion with a notch adjacent to a lower supporting portion on the remaining two opposing inside panels of said box.

4. The portable barbecue of claim 1 including a piano-type hinge on one side of said cover securing said cover to said box and an overhang on the other side of said cover for resiliently cooperating with said clamp.

5. In a portable barbecue, a box including end panels, a front panel, a rear panel, and a bottom, shaped legs connected to said box, a cover, at least one hinge connecting one side of said cover to said box, a clamp detachably securing the opposite side of said cover to said box, a grill, channels formed in said end panels for grill supports, and notched grill supports affixed to said side panels.

6. The portable barbecue of claim 5 wherein said shaped legs include a ventilating opening between their supporting surfaces.

7. The portable barbecue of claim 6 including a handle on said cover for carrying said barbecue, and wherein said hinge extends substantially the whole length of said cover and wherein the said notched grill support opposite said hinge extends less than the length of said front panel.

References Cited

UNITED STATES PATENTS

| | | | |
|---|---|---|---|
| 1,545,854 | 7/1925 | Devereux | 126—25 |
| 1,919,898 | 7/1933 | Martin | 126—38 |
| 2,403,134 | 7/1946 | Stephenson | 126—29 |
| 2,781,037 | 2/1957 | Vuncannon | 126—25 |
| 2,786,463 | 3/1957 | Vincent | 126—25 |
| 2,791,959 | 5/1957 | Pirz | 126—25 X |
| 2,943,557 | 7/1960 | Svehlsen | 126—25 |
| 2,983,269 | 5/1961 | Montesano | 126—25 |
| 3,227,149 | 1/1966 | Clark | 126—4 |
| 3,320,942 | 5/1967 | Christensen | 126—25 |
| 3,327,698 | 6/1967 | Leslie | 126—25 |

FREDERICK KETTERER, *Primary Examiner.*